J. H. NORRIS, DEC'D.
E. M. NORRIS, EXECUTRIX.
METER.

Reissued Nov. 22, 1921. APPLICATION FILED OCT. 8, 1921. 15,232.

Witnesses:
Geo. L. Cheney.

Inventor
John H. Norris
By his Attorney:
Gifford Bull

UNITED STATES PATENT OFFICE.

JOHN H. NORRIS, DECEASED, LATE OF NEW YORK, N. Y., BY EMMA M. NORRIS, EXECUTRIX.

METER.

15,232. Specification of Reissued Letters Patent. Reissued Nov. 22, 1921.

Original No. 1,388,835, dated August 23, 1921, Serial No. 147,536, filed February 9, 1917. Application for reissue filed October 8, 1921. Serial No. 506,812.

*To all whom it may concern:*

Be it known that JOHN H. NORRIS, deceased, late a citizen of the United States, residing at New York city, borough of Manhattan, in the county of New York and State of New York, did invent certain new and useful Improvements in Meters, of which the following is a specification.

This invention relates to new and useful improvements in meters, and more particularly to water meters in which a cover glass or other transparent plate covers an indicating means, such as a dial or number wheels, through which transparent plate the indications on the indicating means are visible. The object of this present invention is to provide an improved means for cleaning the under-face of the cover plate and removing water of condensation therefrom, so that the transparency thereof will be maintained, and the indicating means will at all times be clearly and completely visible through said plate to the reader. A further object is to provide a cleaning means so constructed and arranged as to be operable at all times to clean or wipe a definite area of the glass or plate, and which will not be likely to become deranged or destroyed, due to continued or careless use so as not to be effective for cleaning the area desired.

A further object is to provide a manually operated cleaning means which will have a definite and determined mode of operation which cannot be varied or departed from by the operator in the normal operation thereof, whereby derangement or destruction of the parts is avoided, due to careless or improper manipulation of the parts.

The invention consists in the improvements to be more fully described hereinafter and the novelty of which will be particularly pointed out and distinctly claimed.

He has fully and clearly illustrated his invention in the accompanying drawings to be taken as a part of this specification, and wherein—

Figure 1:
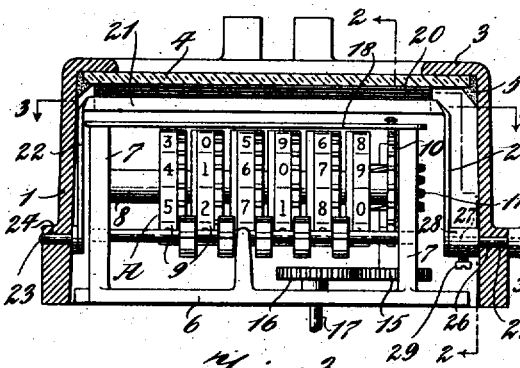
Figure 1 is a sectional view taken through that part of a meter casing which incloses the indicating means, the latter being shown in side elevation and the casing including a cover glass to which my invention is applied.

He has fully illustrated in the drawings that portion of a meter casing associated with the indicating mechanism and carrying the dial or cover glass and have omitted the measuring mechanism, because his invention will be readily understood without illustration of the latter. It is to be understood that the invention is applicable to various types of meters without regard to the type or specific construction, either of the indicating means or the measuring mechanism.

Referring to the drawings by characters of reference, 1 designates that portion of the meter casing which contains the registering or indicating means which is shown generally at A. A portion of the casing 1 is provided at its base with a flange 2, by means of which it is attached to the main body of the meter casing containing the measuring or driving mechanism, which, as above stated, is not shown, while the opposite end of the casing is provided with an overhanging flange 3 against the under-face of which is seated a dial or cover glass 4, which closes this end of the casing and is sealed in place by any suitable sealing means 5. Within this casing, as heretofore stated, is arranged the indicating mechanism A, comprising a frame consisting of a base 6 supporting standards or end plates 7, in which are journaled the ends of shaft 8 bearing the registering or indicating wheels 9. The shaft 8 carries on one end a gear 10 driven by a worm 11 on a vertical shaft 12, journaled in bearings 13, 14, on one of the end plates 7. The vertical shaft 12 carries at its lower end a gear 15 with which meshes a gear 16 on the upper end of a shaft 17, which is driven from the measuring mechanism or piston of the meter, not shown. Inasmuch as the specific construction of the registering or indicating means forms no part of this present invention, excepting in so far as it may enter into combination therewith, it is not deemed necessary to describe the same in greater detail than by the description just given. In connection with the type of indicating means which has been shown and described above by way of exemplification, and arranged over the indicating wheels and supported by the upper ends of the standards 7, is a dial plate 18 having a slot or aperture 19 through which the indicating wheels 9 are visible in order that the numbers appearing on said wheels will be visible and the condition of the meter may be ascertained.

Figure 2:
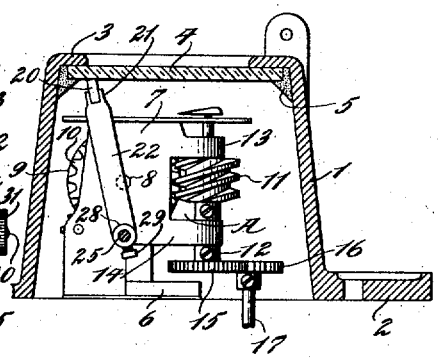
Fig. 2 is a section on the line 2—2 of Fig. 1, the indicating means, and the wiping or cleaning means being shown in end elevation.
Figure 3:
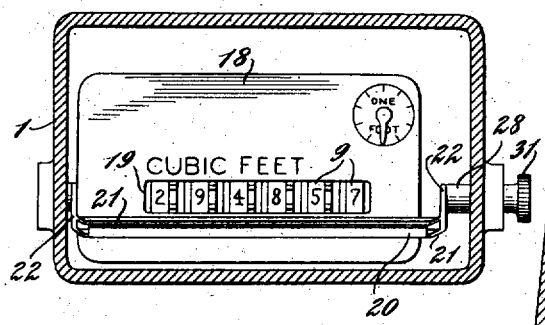
Fig. 3 is a section on the line 3—3 of Fig. 1, the indicating mechanism and the cleaning or wiping means being shown in top plan view.

The improved wiper means or cleaning means for wiping or maintaining clean the under-face of the cover glass, so that the indication on the indicating wheels may be clearly visible when it is desired to take the state of the meter will now be described. This means includes a wiper member 20, preferably consisting of a strip of felt, rubber or other suitable substance, said member being arranged between the cover glass and the indicating means and carried by a channel bar 21, the wiper member being held by any suitable means within the channel of said bar and said member and bar being longitudinally parallel to the axis of the shaft 8. The bar 21 is supported at its ends by the upper ends of swinging arms 22 arranged outside of the said standards 7 and pivoted to the end walls of the meter casing 1, whereby the wiper member may swing on an axis parallel to the plane of the cover glass and in a straight line across and in contact with the under-face of the latter. It will also be seen that the arrangement is such that the wiper member moves back and forth in a fixed path over the indicating wheels, so that the entire area of the cover glass over said wheels may be maintained clear whereby the indications on all of said wheels may at all times be made visible to the person desiring to ascertain the state of the meter. As shown in Figs. 1, 2 and 3, the pivot for the lower end of one of the arms 22 consists of a short pin or journal 23, seated in a bearing aperture 24 in the wall of the casing 1, while the lower end of the other arm is mounted to turn with a short operating stud shaft 25 journaled in an opening 26 in the wall of the casing and having its inner end projecting within the casing, as shown at 27, the lower end of the arm 22 carrying a collar or sleeve 28 seated on the said inner end of said shaft and secured thereto by set screw 29. The outer end 30 of the shaft, that is, the part projecting exteriorly of the casing, carries a thumb wheel 31 by means of which the said operating shaft may be rocked to cause the wiper member to traverse the glass. The arrangement of the sleeve 28 with the set screw 29 provides for an axial adjustment of the wiper relative to the operating shaft so as to determine the area of the glass over which the wiper member shall pass.

Figure 4:
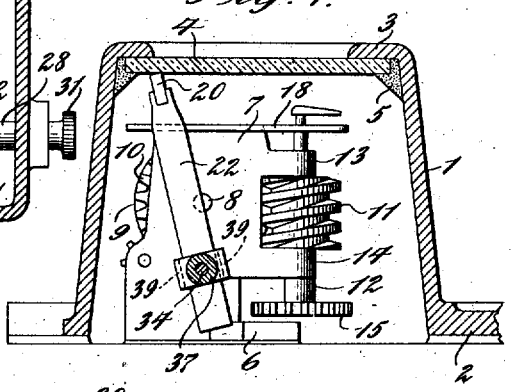
Fig. 4 is a view similar to Fig. 2, but showing a slightly modified form of the wiping or cleaning means.
Figure 5:
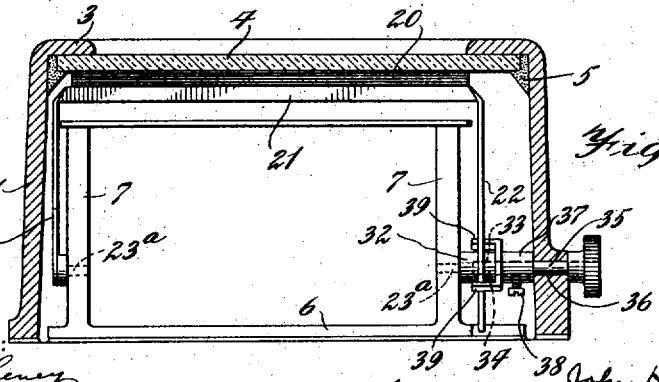
Fig. 5 is a view similar to Fig. 1 and showing in front elevation the same modified form of the wiping or cleaning means which is illustrated in Fig. 4.

In Figs. 4 and 5 I have shown a slightly modified embodiment of the invention and in which the arms 22 of the wiper device instead of being pivoted to the casing, as shown in Figs. 1, 2 and 3, are pivoted to the supports or standards 7, as shown at 23ª. In this form of the invention one of the arms 22 is pivoted on a boss 32 having a recess 33 in its outer end which receives the inner end 34 of an operating shaft 35 journaled in an opening 36 in the end wall of the casing. The inner end of this operating shaft carries a sleeve 37 adjustably secured to said shaft by a set screw 38, said sleeve carrying a yoke having a pair of spaced arms 39 which receive between them said arm 22, so that when the shaft 35 is rotated the arms 39 will engage the opposite sides of the arm 22 to rock the wiper member on its pivots. In this form, the set screw 38 serves for adjustment of the yoke axially of the operating shaft 35 so as to determine the extent of movement to be given to the wiper member. The operating shaft carries at its outer end a thumb piece by means of which the operating shaft is rotated.

In both of the embodiments above described it will be seen that the wiper member 20 moves back and forth laterally in a straight line over the indicating means, and traverses a definite and determined area over all of the indicating wheels so that the latter are at all times visible through the cover glass. The wiping member is movable to the same extent over each and all of the number wheels, so that the glass is wiped to the same extent over all of said wheels maintaining all of the latter equally visible. It will also be seen that the wiper member is supported by the arms 22 in such a manner as to obviate such derangement of the said member due to rough or careless handling as to render it ineffective to clean the desired area of the glass. By housing all of the wiper mechanism within the casing, with the exception of the thumb piece, there are no parts of the mechanism proper which project from the case while the mechanism is being operated or during periods between operations, so that there are no projecting parts likely to become bent or deranged so as to prevent effective and proper operation of the device when desired.

What is claimed and desired to be secured by Letters Patent of the United States is:—

1. In a meter, a casing provided with a glass through which parts within the casing are visible, a wiper comprising a member contacting with the inner surface of said glass and two arms connected with the ends of said member and pivotally mounted within the casing, and manually operable means for swinging the wiper about its pivots.

2. In a meter, a casing provided with a glass through which parts within the casing are visible, a wiper comprising a member contacting with the inner surface of said glass and two arms connected with the ends of said member and pivotally mounted within the casing, and a shaft extending through a wall of the casing and adapted to swing the wiper about its pivots.

3. In a meter, a casing provided at one end with a glass through which parts within the casing are visible, a wiper comprising a U-shaped frame having its leg members pivotally supported within the casing and its connecting member provided with means contacting with the inner surface of said glass, and a shaft extending through a side wall of the casing and adapted to swing the wiper on its pivots.

4. In a meter, a casing provided at one end with a glass through which parts within the casing are visible, a wiper comprising a U-shaped frame having its leg members pivotally supported within the casing and its connecting member provided with means contacting with the inner surface of said glass, and a shaft extending through a side wall of the casing and provided at its inner end with means engaging one arm of the wiper whereby the wiper may be swung about its pivots.

EMMA M. NORRIS,
*Executrix of John H. Norris, deceased.*